Dec. 31, 1968   P. F. HARRISON   3,418,693
DOUBLE ACTING PRESS MECHANISM FOR INJECTION MOULDING MACHINES
Filed Jan. 6, 1966
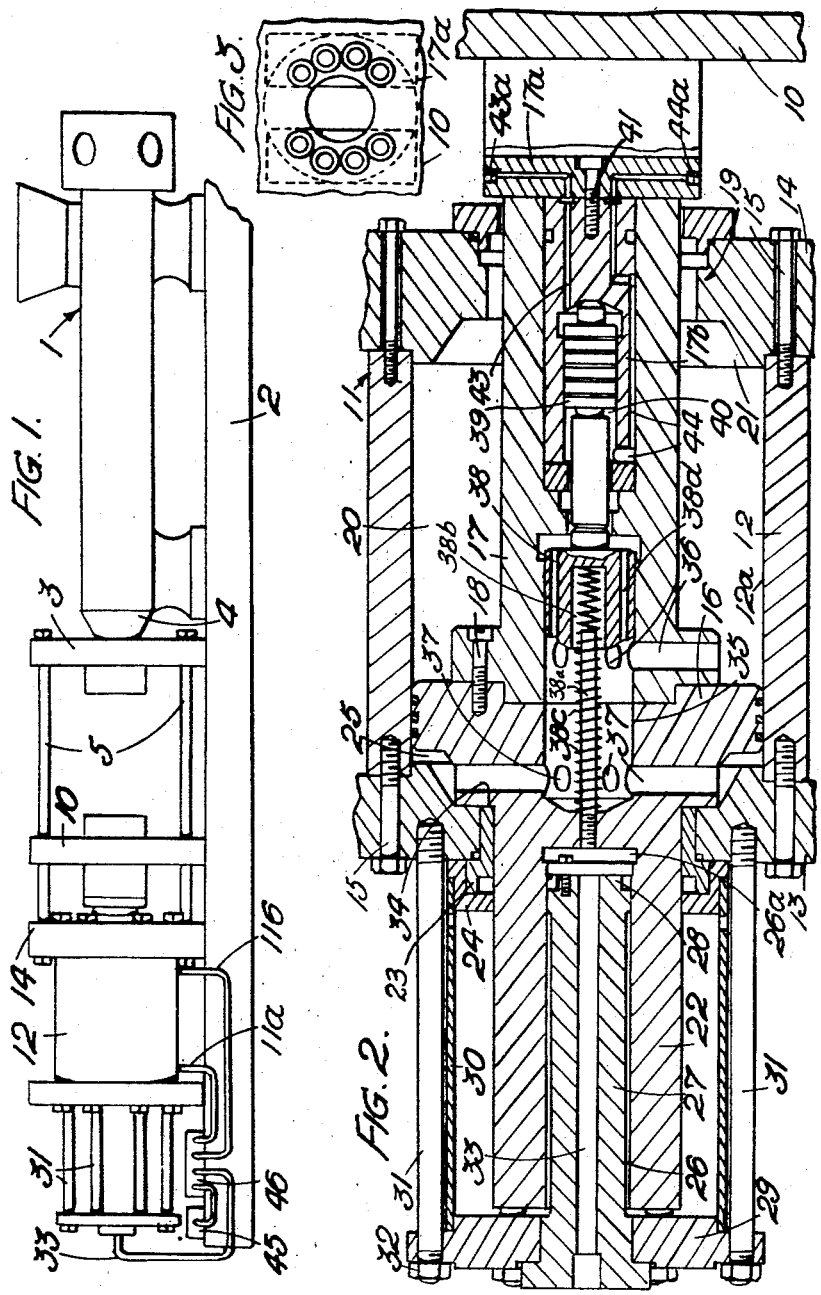
Inventor:
Peter Franklin Harrison
Watson, Cole, Grindle & Watson
Attorneys United States Patent Office 3,418,693
Patented Dec. 31, 1968

3,418,693
DOUBLE ACTING PRESS MECHANISM FOR INJECTION MOULDING MACHINES
Peter Franklin Harrison, London, England, assignor to Peco Machinery Limited, London, England, a British company
Filed Jan. 6, 1966, Ser. No. 519,047
Claims priority, application Great Britain, Jan. 7, 1965, 824/65
9 Claims. (Cl. 18—30)

ABSTRACT OF THE DISCLOSURE

A press mechanism, particularly suitable for an injection moulding machine, has a double acting ram consisting of a piston movable in a cylinder with a passage through the piston to connect the two sides thereof, this passage including a valve. Means are provided for applying fluid pressure to unequal areas on the two sides of the piston. With the valve open, rapid movement of the piston can be achieved whereas, by closing the valve, a larger force with slower movement is obtained. In a press mechanism for injection moulding machine, closing of a movable mould part is preferably effected by applying fluid pressure to a first area on one side of the piston and fluid pressure to second and third areas on the other side of the piston, the second and third areas being together greater than the first area. Closing the valve and opening the first area to drain enables a high pressure to be obtained and final mould closing movement. Opening of the mould is obtained by applying fluid pressure to the first and second areas of the piston only with the valve open, the second area being less than the first area.

---

This invention relates to press mechanisms and has a particularly important but not exclusive application in moulding machines, such as injection moulding machines, for moving one mould-section-carrying platen towards and away from a fixed mould-section-carrying platen.

According to this invention there is provided a press mechanism incorporating a double-acting ram comprising a ram piston, a ram cylinder in which the piston is slidable and which provides a first cylinder space bounded by a first area of one side of the piston, and a second cylinder space bounded by a second area of the other side of the piston, which cylinder has first pressure fluid inlet and outlet means opening to the first cylinder space and second pressure fluid inlet and outlet means opening to the second cylinder space, said first and second areas being unequal, a passage interconnecting the two cylinder spaces, and a valve selectively operable to open and close the passage.

The invention also provides an injection moulding machine comprising a base, a fixed platen for carrying a first mould part, which fixed platen is mounted on the base, a movable platen for carrying a second mould part which movable platen is disposed facing the fixed platen, and a press mechanism as set forth in the preceding paragraph for moving the movable platen towards and away from the fixed platen, the ram cylinder and ram piston being coupled one to the base and the other to the movable platen. Preferably, tie rods are provided extending between the fixed platen and the ram cylinder.

According to a preferred feature of the invention said second area is less than said first area, and there is provided means for applying fluid pressure to the piston on a third area on said other side of the piston, the sum of said second and third areas being greater than said first area.

According to another preferred feature of the invention the piston has at said one side a piston rod which projects axially from the cylinder and has at said other side an axially-extending axially-bored rod portion, and a plunger is fixed to the ram cylinder and projects axially into sealing slidable engagement in the bore in said rod portion. Preferably the annular area of the piston surrounding said rod portion constitutes said second area, and the area of the bore in the rod portion constitutes said third area.

According to yet another preferred feature of the invention the valve controlled passage is formed in the piston.

According to still another preferred feature of the invention said passage comprises an axial bore opening through first port means in the bore to one of said two cylinder spaces and opening through second port means in the bore to the other of said two cylinder spaces, the first port means being axially spaced from the second port means, said valve comprising a piston valve slidable in the bore into a first position in which the first and second port means are in open communication with each other and a second position in which communication between the first and second port means is cut off. Preferably the piston valve blanks off one of said port means in said second position.

According to another preferred feature of the invention valve means is provided which is operable to block the flow of pressure fluid into and out of said two cylinder spaces.

One embodiment of the invention as applied in an injection moulding machine will now be described by way of example with reference to the accompanying drawings in which:

FIGURE 1 is a diagrammatic view of a press mechanism coupled to an injection moulding machine, FIGURE 2 shows an axial section of the press mechanism, and FIGURE 3 shows a fragmentary view of the press mechanism in the direction of the arrows 3—3 in FIGURE 2.

Referring first to FIGURE 1, a screw-type plasticizing and injection unit 1 is mounted on a base 2. This unit may for example be similar to that described in U.S. Patent No. 3,068,521. A fixed platen 3 is mounted on its edge on the base 2 and encircles the injection nozzle 4. Four tie bars 5 are secured by one end to platen 3 at its corners, and extend through bushes in the corners of a platen 10 which is slidable along the base and the tie bars towards and away from the fixed platen 3. Platen 10 is moved in this manner by a press mechanism which comprises a double-acting hydraulic ram.

Referring now particularly to FIGURES 2 and 3 of the drawings, the ram comprises a ram cylinder 11 secured to base 2 and formed by a hollow cylinder section 12 having annular end plates 13, 14 respectively secured to its two ends by rings of bolts 15. The ends of tie bars 5 are secured to end plate 14. A piston 16 is slidably mounted in the bore 12a of the cylindrical section 12. A piston rod 17 flanged at its rearward end is secured on the front face of the piston by bolts 18 extending through the flange and projects through the central aperture in the cylinder end plate 14, the platen 10 being bolted on the forward end of the piston rod. A gland 19 is mounted in the end plate 14 round the piston rod to form a seal against leakage from the annular cylinder space 20. An annular recess 21 is formed on the inner or rearward face of the end plate 14 to accommodate the flange on the piston rod 17.

The piston has a rearward axial rod or extension portion 22 which projects through the aperture in the end plate 13. A gland packing piece 23 is secured in the end plate 13 round the extension 22 by a locating member 24 and serves to prevent leakage from the annular cylinder space 25 encircling the extension.

A central axial bore 26 forming a cylinder space 26a extends from the rearward end of the extension through a major part of the length of the latter, and a fixed plunger 27 having a head 28 projects into this bore. The plunger is secured by its rearward end to a support plate 29 which is spaced from the end plate 13 by a relatively thin cylindrical shell 30 and the annular locating member 24. The locating member is slidingly engaged on the head of the gland packing piece 23 and holds the latter in place, and one end of the shell 30 registers in a rebate on the rear end of the locating member 24. The other end of the shell is centred on a rebate on the support plate 29, and the assembly comprising the support plate 29, shell 30, and locating member 24 is held together against the end plate 13 by a ring of axial studs 31 which are screwed into the end plate, extend through apertures in the support plate and have nuts 32 screwed on their ends.

The shell 30 acts as a sump to collect any hydraulic liquid which escapes from cylinder space 25 past the gland packing 23 and from the bore 26 within extension 22 past the head 28 of plunger 27.

Thus, the forward side of piston 16 has a single effective area and the rearward side of piston 16 has two effective areas i.e. the annular area between extension 22 and the wall of bore 12a, and the cross-sectional area of bore 26 in piston extension 22. The piston has a shoulder 34 which abuts the end of an annular recess on the forward side of end plate 13 to space the outer portion of the rearward face of the piston from the end plate when the piston is at the rearward end of its stroke.

Passages 11a, 11b open to the two ends of the space within cylinder 11, and a passage 33 extends axially through the plunger 27 and plunger head 28, and these passages can be selectively connected to exhaust, or to a source 45 of hydraulic fluid under pressure, or can be blocked, by means of a valve 46. The passage 33 thus enables pressure fluid to be introduced into the cylinder space 26a to act on the plunger 27 under the control of the valve 46.

A transfer passage to enable hydraulic fluid to flow between cylinder spaces 20 and 25 is formed in piston 16 and comprises a central axial bore 35 in the piston opening through a first set of radially-extending ports 36 to the cylinder space 20 and through a second set of radially-extending ports 37 to cylinder space 25. A piston valve member 38 is slidably mounted in bore 35 and is movable between a first position, in which the valve is shown in the drawing and in which the transfer passage is open and a second, rearward, position in which the valve member is centrally disposed across the inner ends of ports 36 to block the ports and prevent flow through the transfer passage. The rearward position of valve 38 is determined by a stop rod 38a which is screwed into piston extension 22 and which is engaged by the bottom of a recess 38b in the piston valve member. A return compression spring 38c encircles stop rod 38a and seats at one end against piston extension 22 and at the other end against the bottom of recess 38b. An axial passage 38d extends through valve 38 to balance the fluid pressures acting on the valve.

The piston valve member is operated by a single-acting piston 39 mounted in a cylinder 40 in the stem 17b of an end-piece 17a of the piston rod, which stem fits into a chamber within the main part of the piston rod. The head and stem of the end-piece are secured together by a bolt 41, and the head of the end-piece is secured to the end of the piston rod 17 by bolts (not shown). The platen 10 is in turn secured by bolts to the head of the end-piece 17a. The head of end piece 17a provides two passages which have screwed ends 43a 44a respectively for a flexible supply pipe 48 and drain pipe 49 and which lead respectively to the two passages 43, 44. The connections to the supply and drain pipes are controlled by a valve 50 enabling passage 43 to be connected either to a source of pressure fluid, when piston 39 moves valve 38 to its position blocking ports 36 against the restraint of spring 38c, or to a drain tank, when spring 38c returns valve 38 to its position in which ports 36 are in open communication with ports 37. Passage 44 is permanently connected to a drain tank.

The external diameter of piston rod 17 is slightly smaller than that of piston extension 22. In the particular example illustrated, the external diameter of piston rod 17 is 6″ and that of extension 22 is 6⅜″. In operation of the mechanism, when it is desired to move platen 10 towards the fixed platen in order to close the mould, hydraulic fluid under pressure is supplied to cylinder spaces 20 and 25 and along passage 33 to act on plunger 27. Passage 44 is connected to drain so that spring 38c holds the piston valve 38 in its position in which the transfer passage is open. The sum of the two effective areas on the rearward side of piston 16 is greater than the effective area of the forward side of the piston, and since fluid at the same pressure is applied to all three spaces, the piston moves forward to bring the mould parts together or very close to each other. The fluid from cylinder space 20 flows through the transfer passage to space 25 as the piston advances, and the amount of fluid which has to be supplied from the pressure source to space 25 is thus relatively small. Consequently, the forward movement of the piston can be very rapid, particularly since the diameter of bore 26 is relatively small, 3″ in the present instance, and since there are only the inertial and frictional forces of the moving parts to be overcome. Furthermore the rapid movement is achieved with a low force, which assists the operation of gap sensors on the mould for detecting the presence of a foreign body between the mould parts. When the mould has been closed or substantially closed, it is necessary to apply a much higher force to the moving platen to clamp the mould sections together for the filling of the mould by the moulding machine. To achieve this clamping force, the piston valve member 38 is moved rearward by supplying pressure fluid to passage 43, and the cylinder space 20 is connected to the drain tank, the pressure in cylinder space 25 and in the plunger cylinder 26a being maintained. When the mould has been filled, and the mould is to be opened, pressure fluid is again supplied to cylinder space 20, passage 43 is connected to drain so that piston valve 38 is moved to its forward position by spring 38a to open the transfer passage, and the plunger cylinder 26a is connected to the drain tank. Since the effective area on the forward side of the piston is greater than the effective annular area which bounds cylinder space 25, the piston and platen 10 are moved rearward rapidly owing to the flow through the transfer passage and the small difference in these two effective areas. It will be understood that for a given rate of feed of fluid into cylinder space 20 the smaller the difference in these two effective areas the more rapid is the movement of the piston, but the difference is made sufficient to provide an adequate force for overcoming frictional resistance to rearward movement of, and accelerating, the piston and platen 10. The difference may be made sufficient to provide also an adequate force for parting the mould section, but alternatively, the parting force may be provided by supplying pressure fluid to cylinder space 20 only and keeping the piston valve 38 in its rearward position until the mould is parted. Thereafter the transfer passage is opened and the rapid opening movement of platen 10 is continued as previously described.

In other arrangements the piston valve may be operated by a double-acting piston and cylinder motor, or by a solenoid.

If the movable platen is required to halt during its rapid closing movement, as for example to permit an insert mandrel to be placed in one of the mould parts, piston valve 38 is moved rearward to block ports 36 and valve 46 is operated to block passages 11a, 11b. A very high decelerating force is thus instantly applied to the ram to provide rapid and accurate stopping without high shock loads. This, in conjunction with the rapid ram movements which can be obtained, helps to minimise the cycle times of the machine. The halt can also be achieved by moving piston valve 38 to block ports 36, and operating valve 46 to connect passages 11a, 11b both to drain.

The valve 38 is closed by the application of fluid pressure to passage 33 when the higher force is required for clamping the mould sections together or if it is required to give additional parting force on opening the moulds or if it is required to halt the movable platen during the closing movement. This operation of valve 38 is thus independent of the timing of operation of the plunger-piston unit 26, 27 and the control of valve 38 can be effected in accordance with the position of the movable platen 10.

I claim:

1. A press mechanism incorporating a double-acting ram comprising a ram piston, a ram cylinder in which the piston is slidable and which provides a first cylinder space bounded by a first area of one side of the piston, and a second cylinder space bounded by a second area of the other side of the piston, which cylinder has first pressure fluid inlet and outlet means opening to the first cylinder space and second pressure fluid inlet and outlet means opening to the second cylinder space, said first and second areas being unequal, a passage through said piston interconnecting the two cylinder spaces, and a valve selectively operable to open and close the passage.

2. A press mechanism incorporating a double-acting ram comprising a ram piston, a ram cylinder in which the piston is slidable and which provides a first cylinder space bounded by a first area of one side of the piston, and a second cylinder space bounded by a second area of the other side of the piston, which cylinder has first pressure fluid inlet and outlet means opening to the first cylinder space and second pressure fluid inlet and outlet means opening to the second cylinder space, a passage through said piston interconnecting the two cylinder spaces, a valve selectively operable to open and close the passage and means for applying said pressure fluid to a third area on said other side of the piston, said second area being less than said first area, and the sum of said second and third areas being greater than said first area.

3. A press mechanism as claimed in claim 2, wherein the piston has at said one side a piston rod which projects axially from the cylinder and has at said other side an axially-extending axially-bored rod portion, and wherein a plunger is fixed to the ram cylinder and projects axially into sealing slidable engagement in the bore in said rod portion.

4. A press mechanism as claimed in claim 3 wherein said second pressure fluid inlet and outlet means opens to the annular area of the piston surrounding said rod portion so that this annular area constitutes said second area and wherein said means for applying fluid pressure to said third area comprises valve control means applying fluid pressure to the area of the bore in said rod portion.

5. An injection moulding machine comprising a base, a fixed platen mounted on said base, a first mould part carried by said fixed platen, a movable platen for a second mould part carried by said movable platen, which movable platen is disposed facing the fixed platen, means for injecting moulding material into the cavity formed by said mould parts and a press mechanism including a ram cylinder and a ram piston being coupled to the movable platen, said ram cylinder providing a first cylinder space bounded by a first area of one side of the piston, and a second cylinder space bounded by a second area of the other side of the piston, which cylinder has first pressure fluid inlet and outlet means opening to the first cylinder space and second pressure fluid inlet and outlet means opening to the second cylinder space, a passage through said piston interconnecting the two cylinder spaces, a valve selectively operable to open and close the passage, and means for applying said pressure fluid to a third area on said other side of said piston, said second area being less than said first area, and the sum of said second and third areas being greater than said first area.

6. A press mechanism as claimed in claim 2, wherein said passage comprises an axial bore opening through first port means in the bore to one of said two cylinder spaces and opening through second port means in the bore to the other of said two cylinder spaces, the first port means being axially spaced from the second port means and wherein said valve comprises a piston valve slidable in said axial bore between a first position in which the first and second port means are in open communication with each other and a second position in which communication between the first and second port means is cut off.

7. A press mechanism as claimed in claim 6, wherein the piston valve blanks off one of said port means in said second position.

8. A press mechanism as claimed in claim 4 wherein valve means are provided operable to block the flow of pressure fluid into and out of said two cylinder spaces.

9. An injection moulding machine as claimed in claim 5, wherein tie rods are provided extending between the fixed platen and the ram cylinder.

References Cited

UNITED STATES PATENTS

| | | | |
|---|---|---|---|
| 2,664,859 | 1/1954 | Green | 92—108 X |
| 2,832,317 | 4/1958 | Henry | 91—216 |
| 3,068,841 | 12/1962 | Robbins | 91—447 X |
| 3,186,305 | 6/1965 | Lorimer | 92—108 X |
| 2,396,539 | 3/1946 | Smith et al. | 18—30 |
| 3,084,512 | 4/1963 | Huelskamp | 18—30 |
| 3,156,014 | 11/1964 | Wenger | 18—30 |
| 3,183,556 | 5/1965 | Studli | 18—30 |

FOREIGN PATENTS

| | | |
|---|---|---|
| 1,016,636 | 10/1957 | France. |
| 1,364,692 | 5/1964 | France. |

WILLIAM L. McBAY, *Primary Examiner.*

U.S. Cl. X.R.

91—216; 92—108; 100—269